(12) United States Patent
Tamagaki et al.

(10) Patent No.: US 10,377,412 B2
(45) Date of Patent: Aug. 13, 2019

(54) STEERING ASSIST CONTROL SYSTEM AND STEERING ASSIST CONTROL METHOD

(71) Applicant: DENSO CORPORATION, Kariya, Aichi-pref. (JP)

(72) Inventors: Mitsuo Tamagaki, Kariya (JP); Hiroaki Tanaka, Kariya (JP); Ifushi Shimonomoto, Kariya (JP); Takuya Mori, Kariya (JP); Yuki Fujisawa, Kariya (JP); Akira Kamiya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 90 days.

(21) Appl. No.: 15/562,599

(22) PCT Filed: Mar. 24, 2016

(86) PCT No.: PCT/JP2016/001715
§ 371 (c)(1),
(2) Date: Sep. 28, 2017

(87) PCT Pub. No.: WO2016/157851
PCT Pub. Date: Oct. 6, 2016

(65) Prior Publication Data
US 2018/0086367 A1    Mar. 29, 2018

(30) Foreign Application Priority Data

Apr. 3, 2015   (JP) .................................. 2015-077086

(51) Int. Cl.
*B62D 5/04*   (2006.01)
*B62D 5/00*   (2006.01)
(Continued)

(52) U.S. Cl.
CPC .......... *B62D 5/0481* (2013.01); *B62D 5/003* (2013.01); *B62D 5/0463* (2013.01);
(Continued)

(58) Field of Classification Search
CPC .... B62D 5/0481; B62D 5/003; B62D 5/0463; B62D 5/0487; B60W 10/20; B60W 30/09; B60W 2510/20; B60W 2710/20
See application file for complete search history.

(56) References Cited

U.S. PATENT DOCUMENTS

2005/0159866 A1   7/2005  Takeuchi et al.
2008/0290829 A1*  11/2008  Suzuki ................... B62D 5/046
                                                    318/563
(Continued)

FOREIGN PATENT DOCUMENTS

JP    H11134581 A    5/1999
JP    2000099835 A   4/2000
(Continued)

*Primary Examiner* — Kevin Hurley
*Assistant Examiner* — Marlon A Arce
(74) *Attorney, Agent, or Firm* — Knobbe, Martens, Olson & Bear, LLP (57) ABSTRACT

A steering assist control system causes multiple actuator units to control an assist torque that provides assistance in steering in accordance with a turning operation on a steering wheel in a vehicle having an information presentation apparatus. The steering assist control system includes: a monitoring part that monitors the actuator units; a torque control part that reduces, in a case of a one-unit anomaly, the assist torque that results from combining output torques from all the actuator units, when the turning operation is performed on the steering wheel; and a warning control part controls the information presentation apparatus. In the case of the one-unit anomaly, the torque control part reduces the assist torque so that the assist torque is smaller than an assist (Continued)

torque output before the occurrence of the one-unit anomaly, every time the turning operation proceeds by a set angle.

7 Claims, 10 Drawing Sheets

(51) Int. Cl.
*B60W 10/20* (2006.01)
*B60W 30/09* (2012.01)

(52) U.S. Cl.
CPC .......... *B62D 5/0487* (2013.01); *B60W 10/20* (2013.01); *B60W 30/09* (2013.01); *B60W 2510/20* (2013.01)

(56) References Cited

U.S. PATENT DOCUMENTS

| | | | | |
|---|---|---|---|---|
| 2008/0309270 | A1* | 12/2008 | Suzuki | B62D 5/0484 318/432 |
| 2013/0320893 | A1* | 12/2013 | Aoki | B62D 5/0484 318/400.18 |
| 2013/0320905 | A1 | 12/2013 | Uryu | |
| 2018/0037214 | A1* | 2/2018 | Otake | B60W 10/18 |
| 2018/0037230 | A1* | 2/2018 | Otake | B60W 10/06 |

FOREIGN PATENT DOCUMENTS

| | | |
|---|---|---|
| JP | 2004010024 A | 1/2004 |
| JP | 2007210365 A | 8/2007 |
| JP | 2009083517 A | 4/2009 |
| JP | 2013086718 A | 5/2013 |
| JP | 2013251936 A | 12/2013 |
| JP | 2014010773 A | 1/2014 |

\* cited by examiner

STEERING ASSIST CONTROL SYSTEM AND STEERING ASSIST CONTROL METHOD

CROSS REFERENCE TO RELATED APPLICATIONS

The present application is based on Japanese Patent Application No. 2015-77086 filed on Apr. 3, 2015, the disclosure of which is incorporated herein by reference.

TECHNICAL FIELD

The present disclosure relates to a steering assist control system and a steering assist control method.

BACKGROUND ART

To provide steering assistance in accordance with the turning operation on a steering wheel, conventional steering assist control techniques controlling assist torque have been used in vehicles.

One type of steering assist control technique disclosed in Patent Literature 1 uses multiple actuator units to control the assist torque. When an anomaly occurs in one of the actuator units, this type of technique stops the anomalous actuator unit. In the event of such a one-unit anomaly, a remaining normal actuator unit continues to output torque and thereby maintains the steering assisting function. This provides enhanced failsafe capability.

PRIOR ART LITERATURE

Patent Literature

Patent Literature 1: JP 2004-10024 A

SUMMARY OF INVENTION

The assist torque results from combining output torques from all the actuator units. The type of steering assist control technique disclosed in Patent Literature 1 produces a reduced assist torque in the event of such a one-unit anomaly where the steering assisting function is maintained. A user who becomes aware of an increase in operation reaction force from the steering wheel can recognize the one-unit anomaly.

Maintaining the assisting function and thereby allowing a user to continue steering may make the recognition of the anomaly by the user less likely. Even if the user notices the anomaly, the user may choose to leave the anomaly unaddressed. Increasing the amount of reduction in assist torque to make the recognition by a user more likely may be an option here; however, this option is not desirable for safety in driving on curved roads and in other conditions because it may degrade the steering assisting function significantly.

It is an object of the present disclosure to provide a steering assist control system and a steering assist control method that provide both enhanced failsafe capability using multiple actuator units and increased recognizability of a one-unit anomaly by a user.

According to one example of the present disclosure, a steering assist control system causes multiple actuator units to control an assist torque that provides assistance in steering in accordance with a turning operation on a steering wheel in a vehicle having an information presentation apparatus. The steering assist control system includes: a monitoring part that monitors the actuator units; a torque control part that reduces, in a case of a one-unit anomaly in which the monitoring part determines that one of the actuator units is anomalous and a remaining one of the actuator units is normal, the assist torque that results from combining output torques from all the actuator units so that the assist torque is smaller than an assist torque output before occurrence of the one-unit anomaly, when the turning operation is performed on the steering wheel; and a warning control part controls the information presentation apparatus, so that a warning sound is presented aurally inside the vehicle when the torque control part reduces the assist torque.

According to another example of the present disclosure, a steering assist control method causes a plurality of actuator units to control an assist torque that provides assistance in steering in accordance with a turning operation on a steering wheel in a vehicle having an information presentation apparatus. The steering assist control method includes: a monitoring step that monitors the actuator units; a torque control step that reduces, in a case of a one-unit anomaly in which the monitoring step determines that one of the actuator units is anomalous and a remaining one of the actuator units is normal, the assist torque that results from combining output torques from all the actuator units so that the assist torque is smaller than an assist torque output before occurrence of the one-unit anomaly, when the turning operation is performed; and a warning control step that controls the information presentation apparatus so that a warning sound is presented aurally inside the vehicle when the torque control step reduces the assist torque.

In the steering assist control system and the steering assist control method according to the present disclosure, in the event of a one-unit anomaly in which one of the actuator units is anomalous and a remaining one of the actuator units is normal, the assist torque that results from combining output torques from all the actuator units is controlled. The assist torque is reduced so as to be smaller than that output before the occurrence of the one-unit anomaly, when the turning operation is performed on the steering wheel. In conjunction with this, the information presentation apparatus is controlled so as to present the warning sound aurally. In this manner, a user in the vehicle can recognize the one-unit anomaly due to not only an increase in operation reaction force from the steering wheel but also the presentation of the warning sound. Hence, while the steering assisting function is maintained with a reduced assist torque, a user can be made aware of the one-unit anomaly every time the steering wheel is turned. Thus, enhancement of the failsafe capability by using the actuator units and enhancement of the recognizability of a one-unit anomaly by a user can be provided simultaneously.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Embodiments of the present disclosure will be described with reference to the drawings. The same symbols may be assigned to corresponding components in the embodiments and description thereof may be omitted. When a configuration is only partially described in an embodiment, description provided in preceding embodiments may be applicable for the rest of the configuration. In addition to combinations of configurations explicitly described in the embodiments, partial configurations in two or more of the embodiments may be combined even if such combinations are not described explicitly, as long as such combinations can be made without a problem.

First Embodiment

Figure 1:
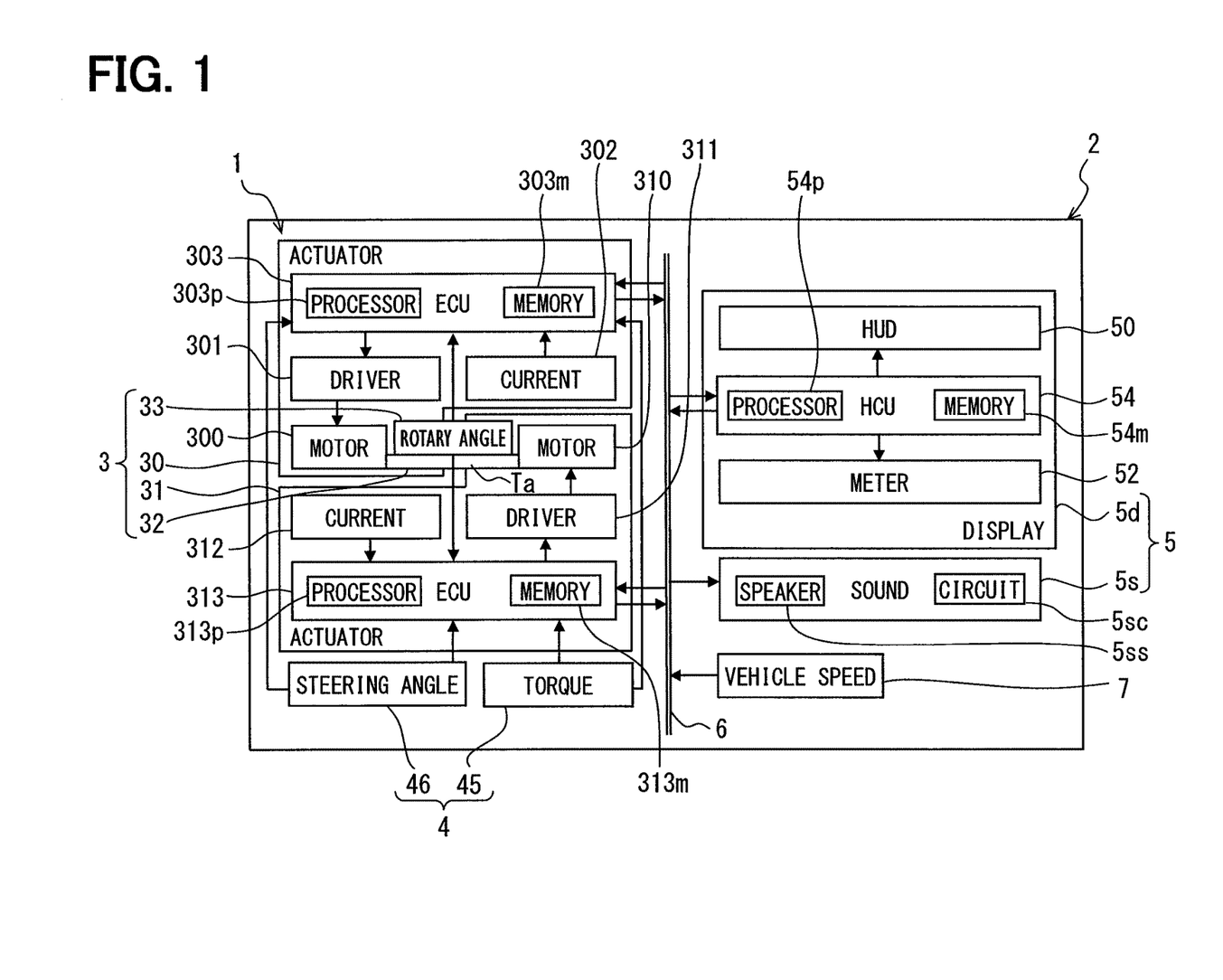
FIG. 1 is a block diagram of a steering assist control system according to a first embodiment.

As described in FIG. 1, a steering assist control system 1 according to a first embodiment to which the present disclosure is applicable includes an electric power steering (EPS) apparatus 3 and an information presentation apparatus 5, which are mounted in a vehicle 2. The EPS apparatus 3 and the information presentation apparatus 5 of the steering assist control system 1 are mutually connected via an in-vehicle network 6, such as a local area network (LAN). A vehicle speed sensor 7 is connected to the in-vehicle network 6. The vehicle speed sensor 7 detects the vehicle speed of the vehicle 2 and outputs a vehicle speed signal in accordance with the sensing. Electric components that output vehicle information that is other than the vehicle speed, navigation information, sign information, obstacle information, and other information are also connected to the in-vehicle network 6.

(Configuration of Apparatuses)

Configurations of the EPS apparatus 3 and the information presentation apparatus 5 are described in detail.

Figure 2:
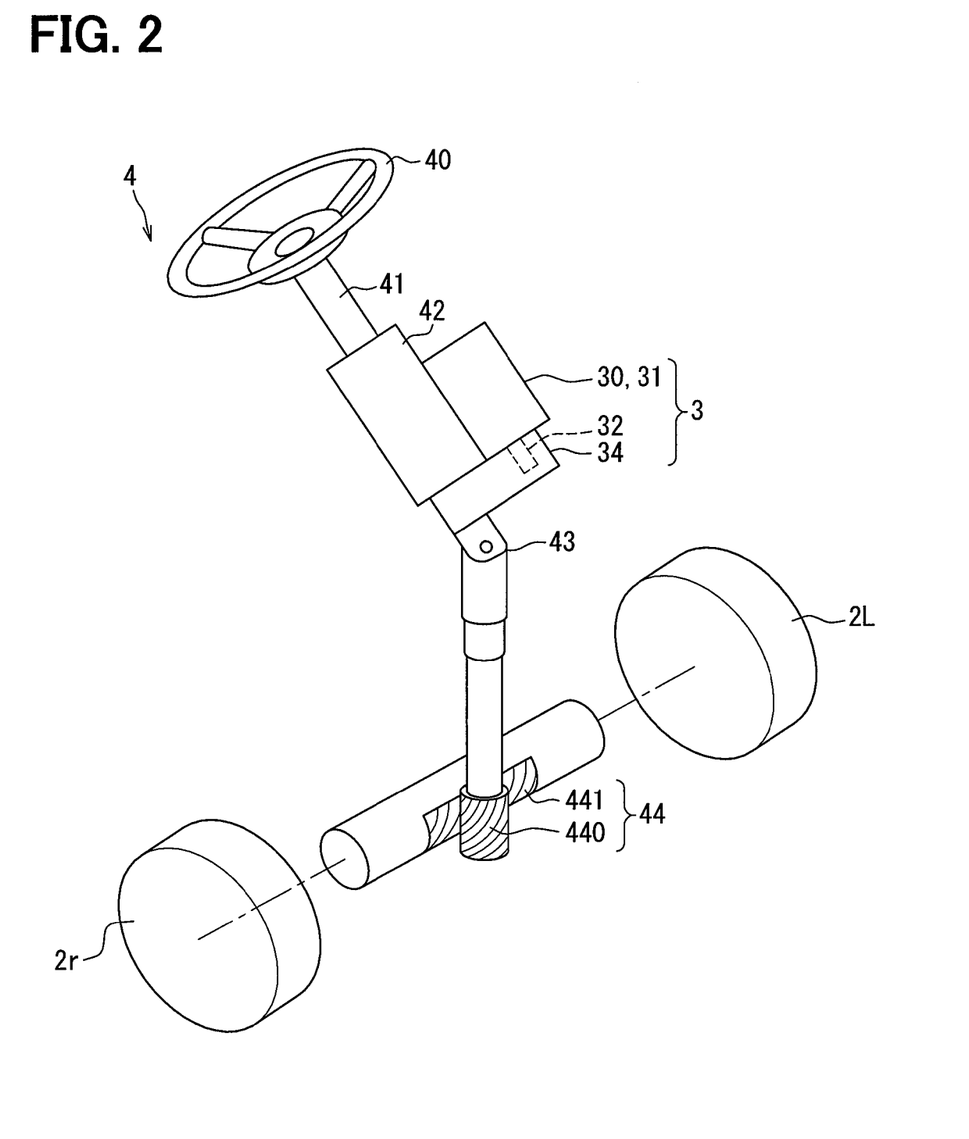
FIG. 2 is a diagram illustrating a configuration of an EPS apparatus and a steering system according to the first embodiment.

As illustrated in FIGS. 1 and 2, the EPS apparatus 3 is disposed on a steering system 4 of the vehicle 2. The steering system 4 includes a steering wheel 40, a steering shaft 41, a column 42, a universal joint 43, a gear box 44, a torque sensor 45, and a steering angle sensor 46.

Figure 3:
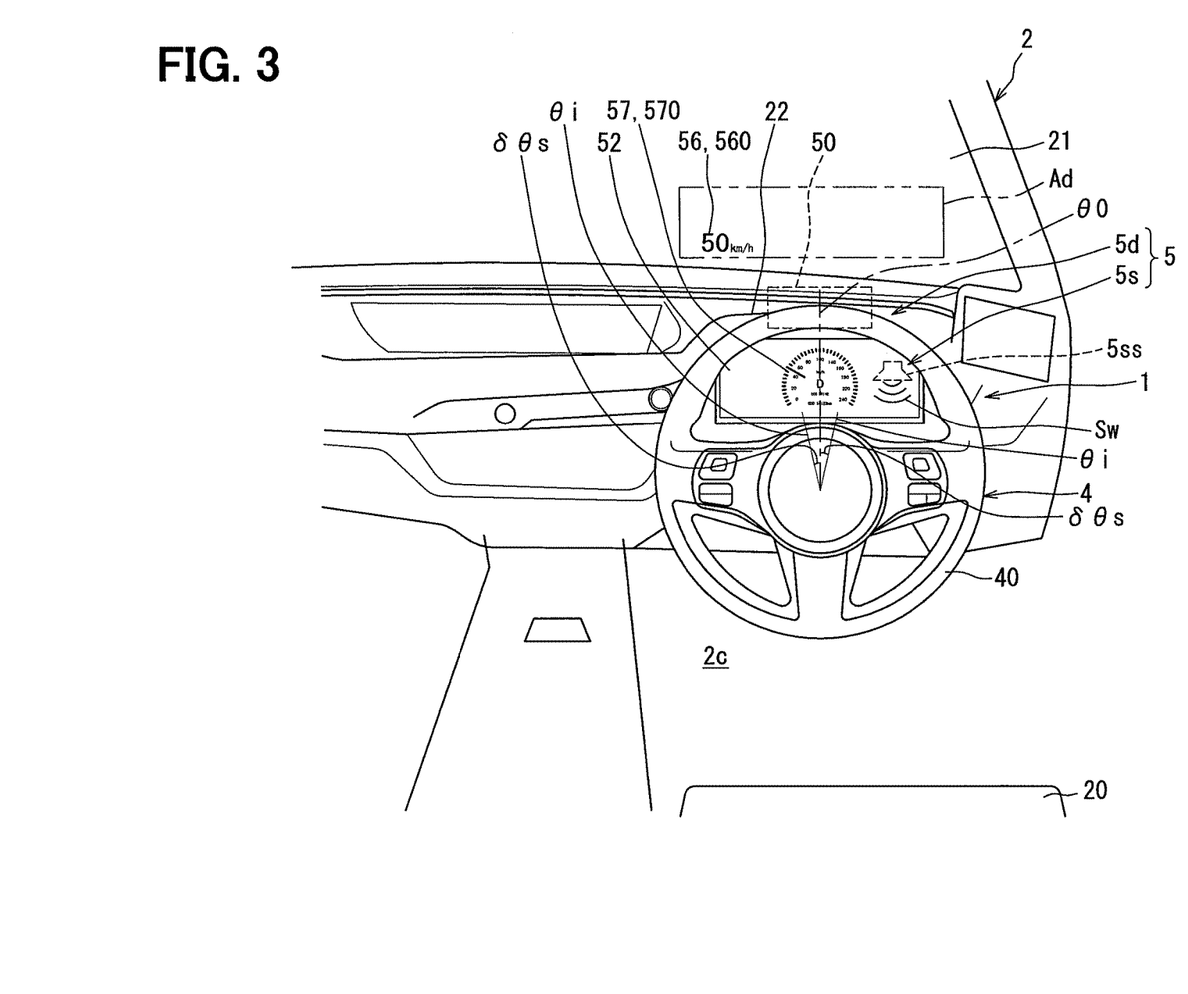
FIG. 3 is a view illustrating a cabin of a vehicle provided with the steering assist control system according to the first embodiment.

As illustrated in FIGS. 2 and 3, the steering wheel 40 is installed forward of a driver seat 20 in a cabin 2c of the vehicle 2. A user in the driver seat 20 can turn the steering wheel 40 to operate it. The steering shaft 41 illustrated in FIG. 2 turns together with the steering wheel 40 in response to a steering torque applied to the steering shaft 41 when the steering wheel 40 is turned. The column 42 is a housing that accommodates a portion of the steering shaft 41 that is located in the cabin 2c. The universal joint 43 receives the steering torque from the steering shaft 41 and transmits the torque to its output end.

The gear box 44 includes a pinion gear 440 disposed on the output end of the universal joint 43 and in mesh with a rack 441. The gear box 44 translates the rotational motion of the pinion gear 440 into the linear motion of the rack 441. The ends of the rack 441 are coupled to steerable wheels 2r and 2l on the right and left of the vehicle 2 via tie rods and the like, respectively. With the configuration described above, the steering system 4 steers the steerable wheels 2r and 2l to the left when the steering wheel 40 is turned to the left and steers the steerable wheels 2r and 2l to the right when the steering wheel 40 is turned to the right.

The torque sensor 45 and the steering angle sensor 46 illustrated in FIG. 1 are disposed in the column 42 (referring to FIG. 2) and connected to the in-vehicle network 6. The torque sensor 45 senses a steering torque applied to the steering shaft 41 when the steering wheel 40 is turned and outputs a torque signal in accordance with the sensing. The steering angle sensor 46 senses a steering angle (that is, a turning angle) of the steering wheel 40 resulting from the turning operation on the steering wheel 40 and outputs a steering angle signal in accordance with the sensing. Here, the steering angle corresponds to a turning angle, for example, $\theta i$ in FIG. 3, by which the steering wheel 40 is turned to the right or left from a point zero $\theta 0$, which corresponds to a straight-ahead direction of the vehicle 2.

The EPS apparatus 3 includes multiple actuator units. As illustrated in FIGS. 1 and 2, the EPS apparatus 3 includes two actuator units 30 and 31. The EPS apparatus 3 also includes an output shaft 32, a rotary angle sensor 33, and a speed reduction mechanism 34, which are for common use by the two actuator units 30 and 31. While the EPS apparatus 3 in the present embodiment is of a column type and is disposed in the column 42 (referring to FIG. 2), the EPS apparatus 3 may be of other types such as a rack type that is disposed in an area surrounding the rack 441.

As illustrated in FIG. 1, the actuator units 30 and 31 include electric motors 300 and 310, drivers 301 and 311, current sensors 302 and 312, and assist ECUs (electronic control units) 303 and 313, respectively.

The electric motors 300 and 310 are three-phase brushless motors or the like and each generate an output torque upon passage of a current. The electric motors 300 and 310 each provide the respective output torque to the common output shaft 32. In the present embodiment, an assist torque Ta is defined as a torque resulting from combining the output torques from all the electric motors 300 and 310. The common rotary angle sensor 33 senses an output rotary angle of the output shaft 32, which rotates in response to the assist torque Ta, and outputs a rotary angle signal in accordance with the sensing.

The drivers 301 and 311 are three-phase inverter circuits or the like. The driver 301 allows a current to pass through the electric motor 300 in the same actuator unit so as to drive the electric motor 300; the driver 311 allows a current to pass through the electric motor 310 in the same actuator unit so as to drive the electric motor 310. The current sensor 302 senses the current allowed to pass through the electric motor 300 by the driver 301 in the same actuator unit and outputs a current signal in accordance with the sensing. The current sensor 312 senses the current allowed to pass through the electric motor 310 by the driver 311 in the same actuator unit and outputs a current signal in accordance with the sensing. The assist ECU 303 includes, as a main component, a microcomputer that includes a processor 303p and a memory 303m. The assist ECUs 313 includes, as a main component, a microcomputer that includes a processor 313p and a memory 313m. The assist ECU 303 is connected to the driver 301 and the current sensor 302 in the same actuator unit and to the in-vehicle network 6 and the sensors 33, 45, and 46. The assist ECU 313 is connected to the driver 311 and the current sensor 312 in the same actuator unit and to the in-vehicle network 6 and the sensors 33, 45, and 46. The assist ECU 303 outputs a drive command signal to the driver 301 in the same actuator unit to control the current passage to the electric motor 300 in the same actuator unit. The assist ECU 313 outputs a drive command signal to the driver 311 in the same actuator unit to control the current passage to the electric motor 310 in the same actuator unit. Here, the assist ECUs 303 and 313 output status signals to each other to monitor the control status of each other and thereby control the assist torque Ta in cooperation with each other. Additionally, the assist ECUs 303 and 313 control the assist torque Ta on the basis of the vehicle speed indicated by the vehicle speed signal, the output rotary angle indicated by the rotary angle signal, the steering torque indicated by the torque signal, the steering angle indicated by the steering angle signal, and the like.

The speed reduction mechanism 34 illustrated in FIG. 2 is configured by combining multiple gears and disposed between the steering shaft 41 and the output shaft 32. The speed reduction mechanism 34 amplifies the assist torque Ta of the output shaft 32 and transmits the result to the steering shaft 41. In this manner, the assist torque Ta provides assistance in steering the steerable wheels 2r and 2l in accordance with the turning operation on the steering wheel 40.

As illustrated in FIGS. 1 and 3, the information presentation apparatus 5, which includes a sound module 5s and a display module 5d, is disposed in the cabin 2c of the vehicle 2 to present various types of information to a user in the driver seat 20.

The sound module 5s is disposed in an instrument panel 22 provided forward of the steering wheel 40 in an area surrounding the steering wheel 40. The sound module 5s is configured by combining a full-range speaker 5ss and a sound source circuit 5sc and connected to the in-vehicle network 6 via the sound source circuit 5sc. The sound module 5s emits from the full-range speaker 5ss, which is placed in the area surrounding the steering wheel 40, a warning sound Sw in an audible range perceptible by a user in the driver seat 20 to present the warning sound Sw aurally. Here, the warning sound Sw may be a sound wave that provides a warning of an anomaly of the EPS apparatus 3. The warning sound Sw may also be, for example, a sound wave that provides a notification or warning of the navigation information and the obstacle information.

The display module 5d includes a HUD 50, a combination meter 52, and an HCU 54. The HCU refers to an HMI (human machine interface) control unit. The HUD 50 and the combination meter 52 may also be referred to as display components.

The HUD (head-up display) 50 is disposed in the instrument panel 22, which is provided forward of the steering wheel 40. The HUD 50 projects a display image 56 formed by a liquid crystal panel, a projector, or the like on a display area Ad of a front windshield 21 of the vehicle 2. Here, a bundle of rays (also referred to as luminous flux) of the display image 56 reflected off the front windshield 21 and a bundle of rays from the external view passing through the front windshield 21 are perceived by a user in the driver seat 20. As a result, a virtual image of the display image 56 that is formed forward of the front windshield 21 is superimposed on a part of the external view, and thereby the virtual image of the display image 56 and a real image of the external view are presented visually to the user in the driver seat 20.

Figure 4:
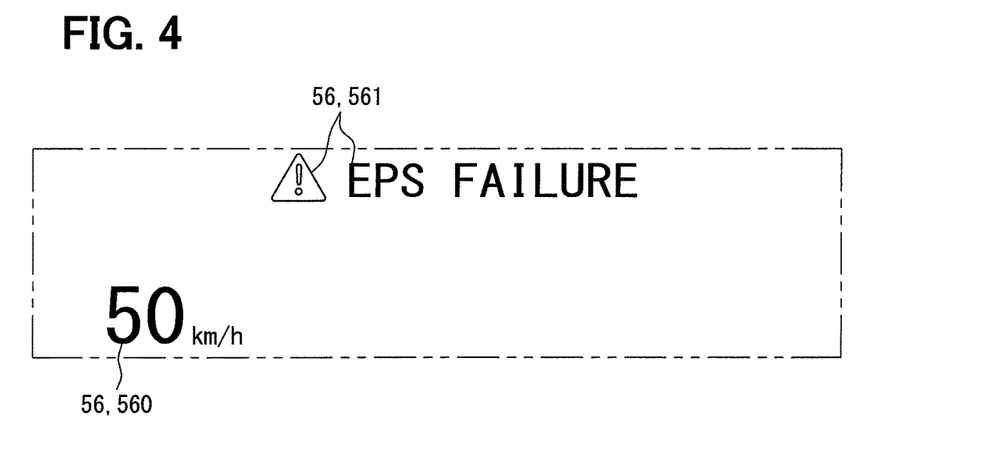
FIG. 4 is a front view of a visual presentation according to the first embodiment.

The display image 56 may be a notification display image 560, which provides a notification of the vehicle speed as illustrated in FIGS. 3 and 4, and a warning display image 561, which provides a warning of an anomaly of the EPS apparatus 3 as illustrated in FIG. 4. The display image 56 may also be, for example, an image that provides a notification of the navigation information, the sign information, and the obstacle information. A light transmissive combiner may be disposed in the instrument panel 22 so as to allow a bundle of rays from the external view to pass therethrough in combination with the front windshield 21. The display image 56 may be projected on the combiner to display a virtual image.

Figure 5:
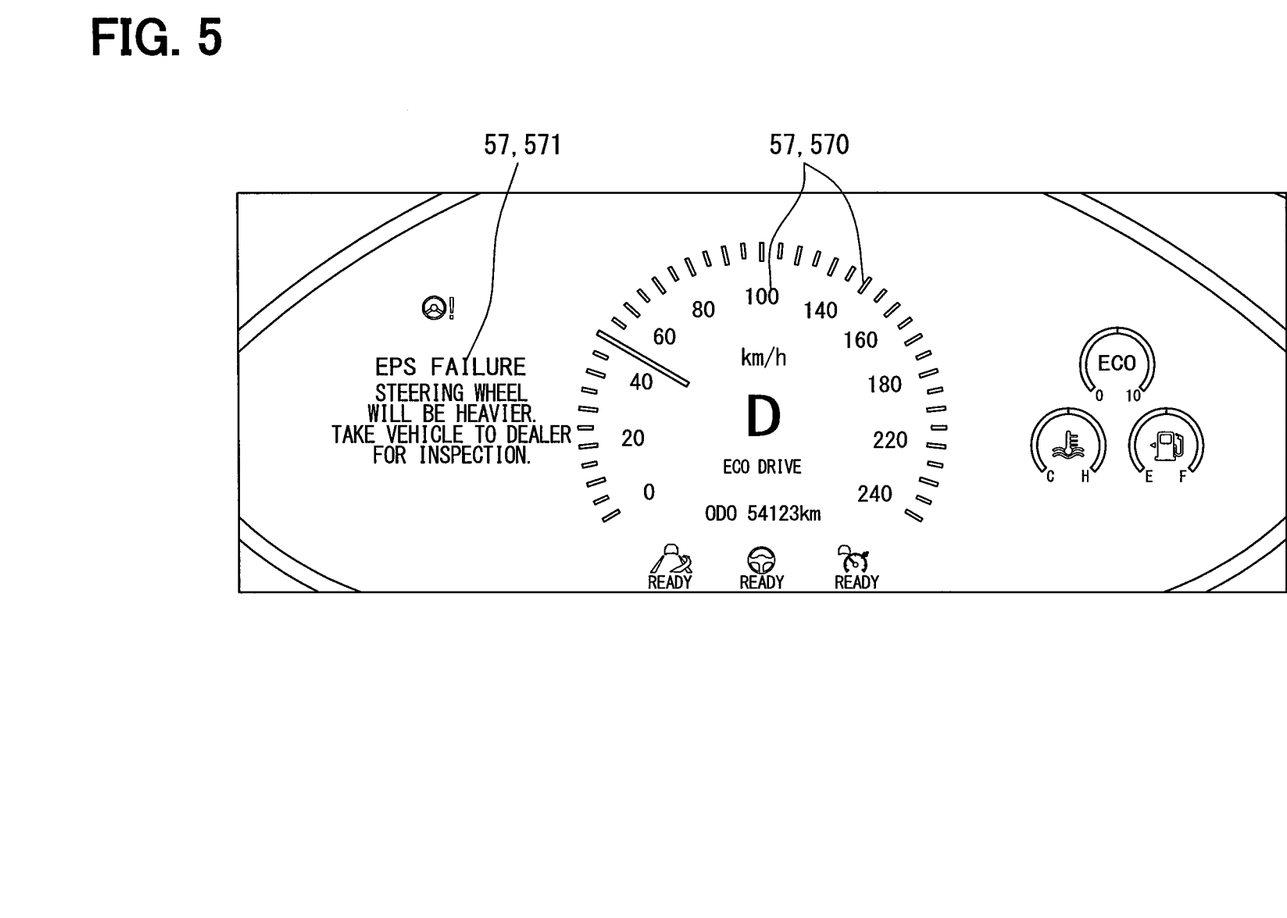
FIG. 5 is a front view of another visual presentation according to the first embodiment.

As illustrated in FIG. 3, the combination meter 52 is disposed in the instrument panel 22, which is provided forward of the steering wheel 40. The combination meter 52 forms a display image 57 using a liquid crystal panel or the like, and presents a real image of the display image 57 visually to a user in the driver seat 20. The display image 57 may be a notification display image 570, which provides a notification of the vehicle speed as illustrated in FIGS. 3 and 5, and a warning display image 571, which provides a warning of an anomaly of the EPS apparatus 3 as illustrated in FIG. 5. The display image 57 may also be, for example, an image that provides a notification of the navigation information, the sign information, and the obstacle information.

As illustrated in FIG. 1, the HCU 54 includes, as a main component, a microcomputer that includes a processor 54p and a memory 54m. The HCU 54 is connected to the in-vehicle network 6 and to the display components 50 and 52 in the display module 5d. The HCU 54 controls the operation of the sound module 5s and the operation of the display components 50 and 52 in the display module 5d. Note that the HCU 54 according to the present embodiment controls the aural presentation of the warning sound Sw by the sound module 5s and the visual presentation of the warning display images 561 and 571 by the display components 50 and 52 on the basis of presentation command signals from the assist ECUs 303 and 313.

(Steering Assist Control Flow)

Figure 6:
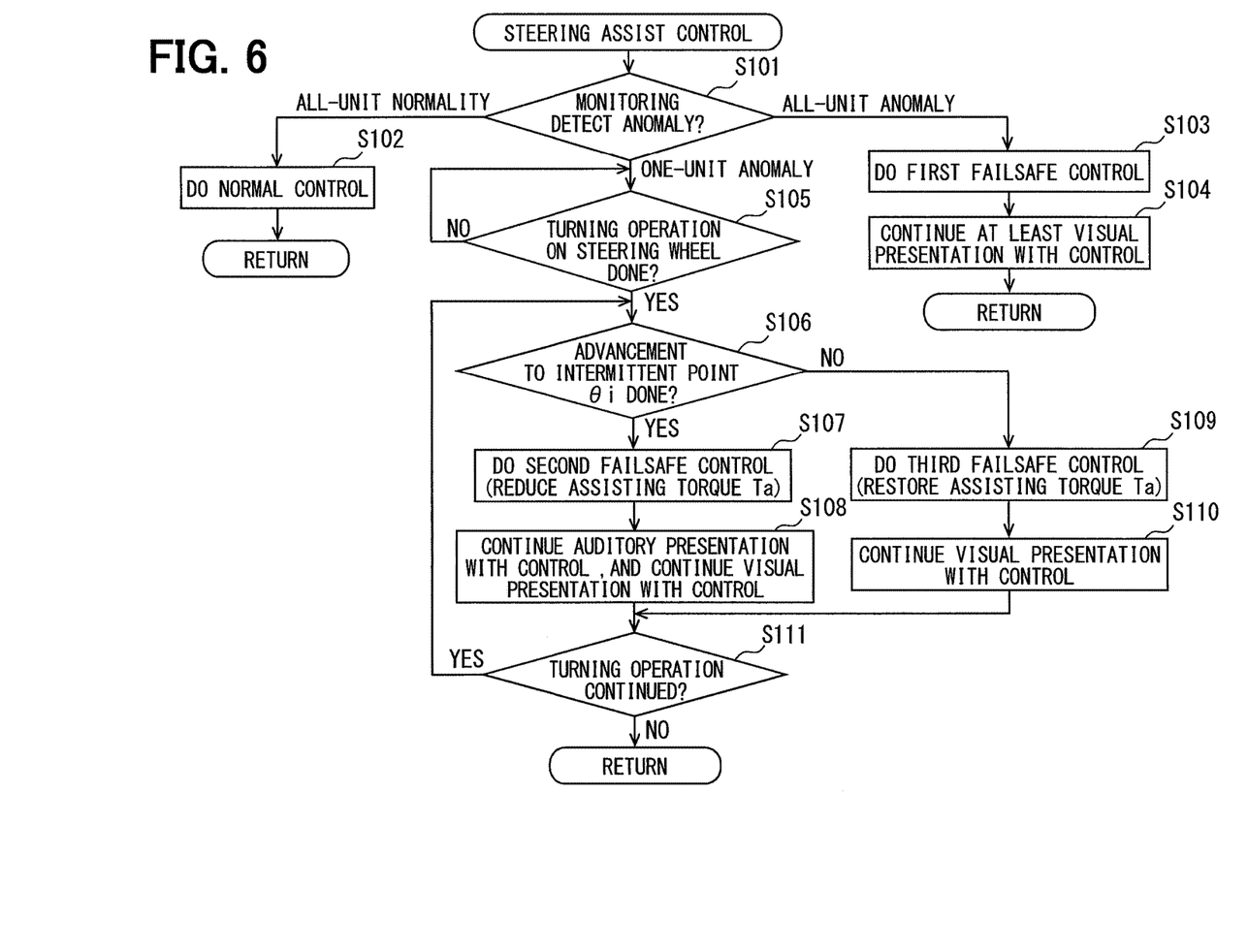
FIG. 6 is a flowchart of a steering assist control flow according to the first embodiment.

A steering assist control flow illustrated in FIG. 6 will be described in detail.

The assist ECUs 303 and 313 and the HCU 54 allow the processors 303p, 313p, and 54p to execute control programs that are individually stored in the memories 303m, 313m, and 54m, respectively, to achieve the steering assist control flow, which is the "steering assist control method," in cooperation with one another. The steering assist control flow is started in response to the operation by a user to turn on a power switch in the vehicle 2 and is finished in response to the operation to turn off the switch. The steering assist control flow includes steps each having a designation that starts with an "S". The memories 303m, 313m, and 54m, which store the control programs to achieve the steering assist control flow, are each configured with one or more storage media, such as a semiconductor memory, a magnetic medium, or an optical disk.

In S101 of the steering assist control flow, the assist ECUs 303 and 313, in cooperation with each other, monitor the actuator units 30 and 31 and determine whether an anomaly is detected in at least one of the actuator units 30 and 31. Here, an anomaly in the actuator unit 30, which is one of the two actuator units, refers to an anomaly that occurs in at least one of the components of the actuator unit 30, that is, the electric motor 300, the driver 301, the assist ECU 303, and the like. An anomaly in the actuator unit 31, which is the other one of the two actuator units, refers to an anomaly that occurs in at least one of the components of the actuator unit 31, that is, the electric motor 310, the driver 311, the assist ECU 313, and the like. Such an anomaly can be detected in any of the actuator units on the basis of the passing current indicated by the current signal, the output rotary angle indicated by the rotary angle signal, the control status indicated by the status signal, and the like.

When it is determined in S101 that all the actuator units 30 and 31 are normal, the flow proceeds to S102. In S102 where all the actuator units are normal, the assist ECUs 303 and 313 perform normal control associated with the assist torque Ta in cooperation with each other. Specifically, in the normal control, current passage is allowed through at least one of the electric motors 300 and 310 in accordance with an operation condition of the vehicle 2, so that an assist torque Ta that suits the operation condition is output. Subsequently, the flow reverts back to S101.

When it is determined in S101 that all of the actuator units 30 and 31 are anomalous, the flow proceeds to S103. In S103 where such an all-unit anomaly has occurred, the assist ECUs 303 and 313 perform first failsafe control associated with the assist torque Ta in cooperation with each other. Specifically, in the first failsafe control, current passage is allowed through at least one of the electric motors 300 and 310 in accordance with an operation condition of the vehicle 2 and what is involved in the all-unit anomaly, so that a minimum assist torque Ta that is required to ensure safety is output.

In S104 after the performance of S103, at least the visual presentation, out of the aural presentation of the warning sound Sw by the sound module 5s and the visual presentation of the warning display images 561 and 571 by the display components 50 and 52, is performed under the control of the HCU 54. Here, at least the visual presentation performed under the control of the HCU 54 is continued until the all-unit anomaly is resolved.

When it is determined in S101 that one of the actuator units 30 and 31 is anomalous and the remaining one of the actuator units 30 and 31 is normal, the flow proceeds to S105. In S105 where such a one-unit anomaly has occurred, the assist ECUs 303 and 313 determine in cooperation with each other whether the steering wheel 40 is being turned. Specifically, it is determined whether there is a turning operation on the steering wheel 40 to the right or left on the basis of the steering angle indicated by the steering angle signal and the steering torque indicated by the torque signal.

While it is determined in S105 that there is no turning operation (corresponding to a negative determination), S105 is performed repeatedly. When it is determined in S105 that there is a turning operation (corresponding to an affirmative determination), the flow proceeds to S106. The assist ECUs 303 and 313 determine in cooperation with each other in S106 whether a steering angle to the right or left with respect to the point zero θ0 has advanced to a predefined intermittent point θi. Specifically, as illustrated in FIG. 3, the intermittent point θi is set for every steering angle advanced by a set angle δθs to the right and left from the point zero θ0. The set angle δθs can be referred to as a predefined angle. It is determined in S106 whether a turning operation on the steering wheel 40 has proceeded by the set angle δθs or more from the point zero θ0 or from an intermittent point θi that has been reached earlier on the basis of the steering angle indicated by the steering angle signal and the steering torque indicated by the torque signal. Here, the set angle δθs is set to, for example, an angular width of about 5 degrees in consideration of, for example, the balance between the recognizability of a one-unit anomaly by a user and inconvenience felt by the user. In FIG. 3, only two intermittent points θi that are set on the both sides of the point zero θ0 are indicated to represent other intermittent points θi, which are omitted in the drawing.

When it is determined in S106 that the steering angle has advanced from the point zero θ0 or from a preceding intermittent point θi to a subsequent intermittent point θi (corresponding to an affirmative determination), the flow proceeds to S107. Note that, in S107, the assist ECUs 303 and 313 perform, in cooperation with each other, second failsafe control that is associated with the assist torque Ta and that accompanies a turning operation on the steering wheel 40. Specifically, in the second failsafe control, current passage is allowed through at least one of the electric motors 300 and 310 in accordance with an operation condition of the vehicle 2 and what is involved in the one-unit anomaly, so that an assist torque Ta that is smaller than that output before the occurrence of the one-unit anomaly during the normal control in S102 is output.

In S108 after the performance of S107, the aural presentation of the warning sound Sw by the sound module 5s and the visual presentation of the warning display images 561 and 571 by the display components 50 and 52 are performed under the control of the HCU 54. Here, the aural presentation and the visual presentation are continued under the control of the HCU 54 until determination in S111 to be described hereinafter is finished.

When it is determined in S106 that the steering angle has not advanced from the point zero θ0 or from a preceding intermittent point θi to a subsequent intermittent point θi (corresponding to a negative determination), the flow proceeds to S109. Note that, in S109, the assist ECUs 303 and 313 perform, in cooperation with each other, third failsafe control that is associated with the assist torque Ta and that accompanies a turning operation on the steering wheel 40. Specifically, in the third failsafe control, current passage is allowed through at least one of the electric motors 300 and 310 in accordance with an operation condition of the vehicle 2 and what is involved in the one-unit anomaly, so that an assist torque Ta that is larger than that output during the second failsafe control in S107 is output. When, for example, the current passage is allowed through only a normal one of the electric motors 300 and 310 when the vehicle 2 is traveling at a high speed, the assist torque Ta is controlled so as to be a torque substantially identical with that output before the occurrence of the one-unit anomaly during the normal control in S102, which is a torque larger than that output during the second failsafe control. When, for example, the current passage is allowed through both of the electric motors 300 and 310 when the vehicle 2 is at a standstill, the assist torque Ta is controlled so as to be a torque smaller than that output before the occurrence of the one-unit anomaly during the normal control and larger than that output during the second failsafe control.

In S110 after the performance of S109, the visual presentation of the warning display images 561 and 571 by the display components 50 and 52 is performed under the control of the HCU 54. Here, the visual presentation is continued under the control of the HCU 54 until the determination in S111 is finished.

After finishing S108 or S110, the flow proceeds to S111. The assist ECUs 303 and 313 determine in cooperation with each other in S111 whether the turning operation on the steering wheel 40 is being continued. Specifically, it is determined whether the turning operation on the steering wheel 40 to the right or left is being continued on the basis of the steering angle indicated by the steering angle signal and the steering torque indicated by the torque signal.

When it is determined in S111 that the turning operation is being continued (corresponding to an affirmative determination), the flow reverts back to S106. When it is determined in S111 that the turning operation is finished (corresponding to a negative determination), the flow reverts back to S101. As described above, in the case of the one-unit anomaly during which S105 to S111 are performed, every time a turning operation on the steering wheel 40 is advanced by the set angle δθs, the assist torque Ta is reduced repeatedly so as to be smaller than that output before the occurrence of the one-unit anomaly during the normal control and the warning sound Sw is emitted intermittently. Here, note that the assist torque Ta according to the present embodiment is reduced for every set angle δθs in S107 and, then, restored in S109 to a torque output before the reduction, which is a torque that is substantially identical with or smaller than that output during the normal control.

In the first embodiment described above, the assist ECUs 303 and 313 that perform S101, which represents a "monitoring step," correspond to a "monitoring part". Also in the first embodiment, the assist ECUs 303 and 313 that perform S105 to S107, S109, and S111, which represent a "torque control step," correspond to a "torque control part." Also in the first embodiment, the HCU 54 that performs S108 and S110, which represent a "warning control step," corresponds to a "warning control part."

(Effects)

Exemplary effects of the first embodiment described above will be described.

In the first embodiment, in the event of a one-unit anomaly in which one of the actuator units 30 and 31 is anomalous and the remaining one of the actuator units 30 and 31 is normal, an assist torque Ta that results from combining output torques from all the actuator units is controlled. The assist torque Ta is reduced so as to be smaller than that output before the occurrence of the one-unit anomaly when a turning operation is performed on the steering wheel 40. In conjunction with this, the sound module 5s of the information presentation apparatus 5 is controlled so as to present the warning sound Sw aurally. In this manner, a user in the vehicle 2 can recognize the one-unit anomaly due to not only an increase in operation reaction force from the steering wheel 40 but also the presentation of the warning sound Sw. Hence, while maintaining the steering assisting function with a reduced assist torque Ta, it may be possible to make a user aware of the one-unit anomaly every time the steering wheel 40 is turned. Thus, it may be possible to achieve enhancement of the failsafe capability by using multiple actuator units, namely the actuator units 30 and 31, and enhancement of the recognizability of a one-unit anomaly by a user simultaneously.

Additionally, in the first embodiment, in the event of a one-unit anomaly, every time a turning operation on the steering wheel 40 proceeds by the set angle δθs, the assist torque Ta is reduced so as to be smaller than that output before the occurrence of the one-unit anomaly. In this manner, according to repeated increase in operation reaction force from the steering wheel 40 for every set angle δθs of the turning operation, it may be possible to make a user aware of the one-unit anomaly with greater ease. That is, it may be possible to enhance the recognizability of a one-unit anomaly by a user.

Additionally, in the first embodiment, in the event of a one-unit anomaly, the assist torque Ta is reduced every time a turning operation on the steering wheel 40 proceeds by the set angle δθs, and then it is restored to a torque that is output before the reduction. In this manner, while the safety is maintained by keeping the amount of reduction in the assist torque Ta at a required minimum, it may be possible to enhance the recognizability of a one-unit anomaly by a user by increasing the operation reaction force from the steering wheel 40 repeatedly for every set angle δθs of the turning operation.

Furthermore, in the first embodiment, in the event of a one-unit anomaly, every time a turning operation on the steering wheel 40 proceeds by the set angle δθs, the warning sound Sw is emitted intermittently. In this manner, in addition to the repeated increase in operation reaction force from the steering wheel 40 for every set angle δθs of a turning operation, it may be possible for a user to receive the warning sound Sw intermittently and repeatedly for every set angle δθs of the turning operation. Thus, it may be possible for a user to recognize a one-unit anomaly reliably. That is, it may be possible to increase the reliability of the effect of enhancing the recognizability of a one-unit anomaly by a user.

Furthermore, in the first embodiment, in the event of a one-unit anomaly, the sound module 5s of the information presentation apparatus 5 emits the warning sound Sw from a place in the area surrounding the steering wheel 40 in the vehicle 2, and thus, it may be possible to make a user be aware that the warning is about a one-unit anomaly that is related to the steering wheel 40 with greater ease. That is, it may be possible to enhance the recognizability of a one-unit anomaly by a user.

Furthermore, in the first embodiment, in the event of a one-unit anomaly, reduction of the assist torque Ta is accompanied by the aural presentation of the warning sound Sw together with the visual presentation of the warning display images 561 and 571 to a user in the vehicle 2. In this manner, it may be possible for a user to recognize the one-unit anomaly with greater ease due to not only an increase in operation reaction force from the steering wheel 40 but also the presentation of the warning sound Sw and the warning display images 561 and 571. That is, it may be possible to enhance the recognizability of a one-unit anomaly by a user.

Second Embodiment

Figure 7:
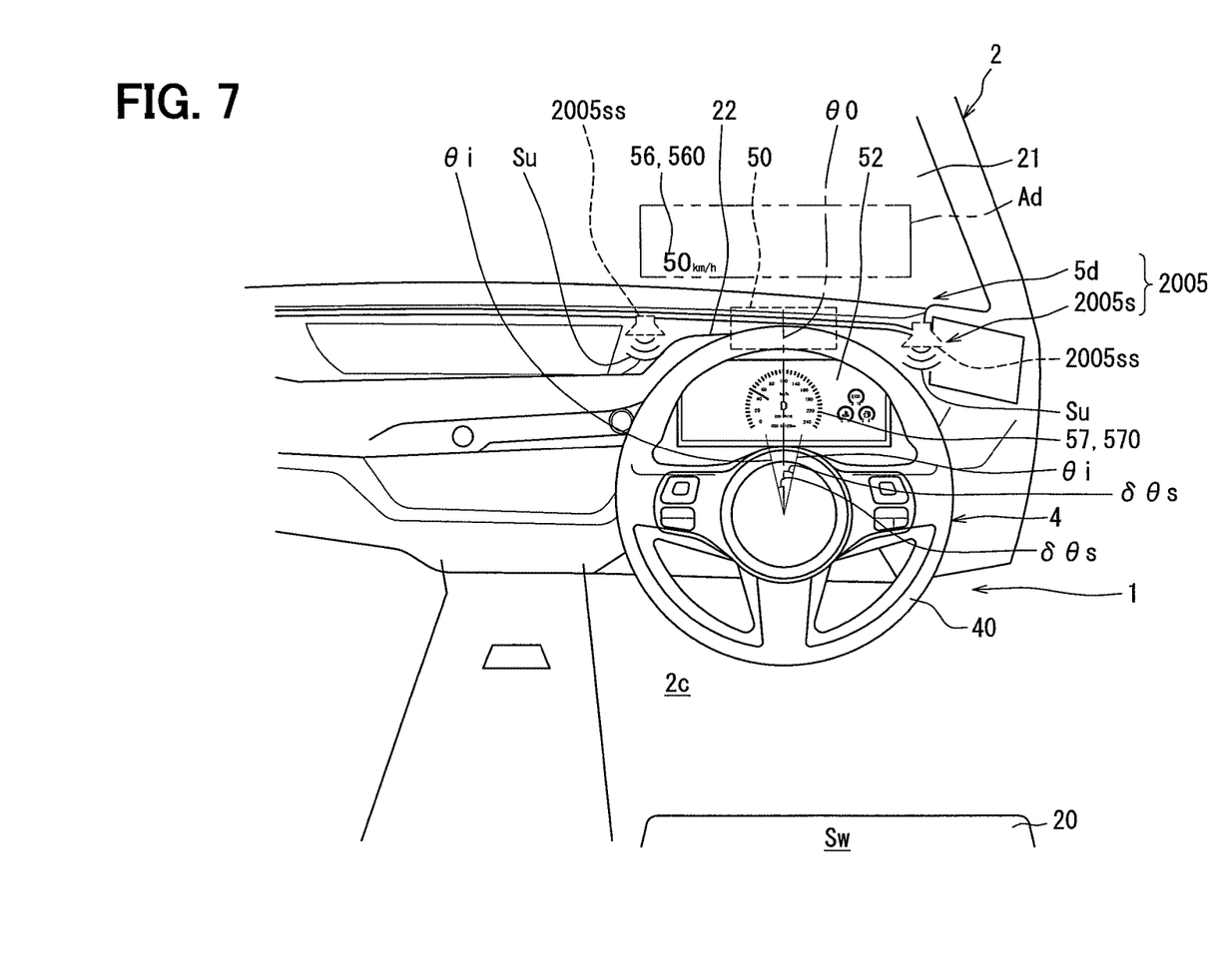
FIG. 7 is a block diagram of a steering assist control system according to a second embodiment.

As illustrated in FIG. 7, a second embodiment of the present disclosure is a modification of the first embodiment. A sound module 2005s of an information presentation apparatus 2005 according to the second embodiment is configured by combining parametric speakers 2005ss, which are interspersed in a cabin 2c of a vehicle 2, and a sound source circuit 5sc and connected to an in-vehicle network 6 via the sound source circuit 5sc. The sound module 2005s emits ultrasonic waves Su from the parametric speakers 2005ss to develop above a driver seat 20 a warning sound Sw in an audible range perceptible by a user and thereby presents the warning sound Sw aurally. That is, the sound module 2005s imparts directivity toward the driver seat 20 to the warning sound Sw.

In the second embodiment as described above, an HCU 54 controls the operation of the sound module 2005s together with the operation of display components 50 and 52 in a display module 5d. Hence, in the second embodiment, the steering assist control flow of the first embodiment is performed with the sound module 5s replaced by the sound module 2005s in S104 and S108. In this manner, effects similar to those in the first embodiment are produced except for the effect of the warning sound Sw emitted from a place in the area surrounding the steering wheel. Furthermore, in the second embodiment, in the event of a one-unit anomaly, the sound module 2005s of the information presentation apparatus 2005 imparts the directivity toward the driver seat 20 in the vehicle 2 to the warning sound Sw, and thus, it may be possible to make a user in the driver seat 20 be aware of the one-unit anomaly reliably. That is, it may be possible to increase the reliability of the effect of enhancing the recognizability of a one-unit anomaly by a user.

Third Embodiment

Figure 8:
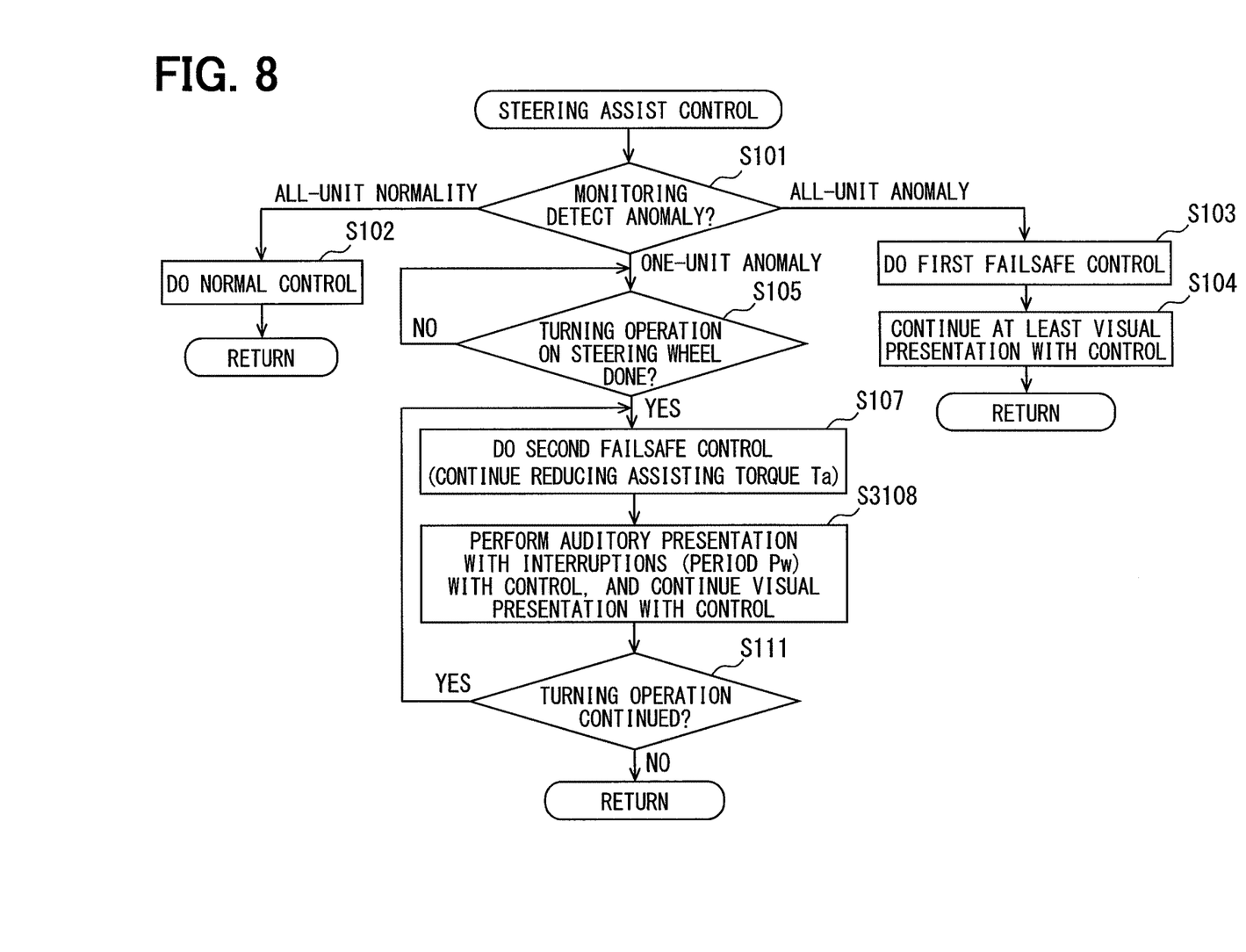
FIG. 8 is a flowchart of a steering assist control flow according to a third embodiment.

As illustrated in FIG. 8, a third embodiment of the present disclosure is a modification of the first embodiment. In a steering assist control flow according to the third embodiment, S106, S109, and S110 are not performed and S108 is replaced by S3108.

In such a steering assist control flow, when it is determined in S105 that there is a turning operation (corresponding to an affirmative determination), the flow proceeds directly to S107 and then to S3108 after performing S107. Specifically, in S3108, the visual presentation of warning display images 561 and 571 by display components 50 and 52 is continued under the control of an HCU 54 until determination in S111 is finished. Also, in S3108, the aural presentation of a warning sound Sw by a sound module 5s is performed with interruptions under the control of the HCU 54 until the determination in S111 is finished. An on-and-off period Pw with which the warning sound Sw is emitted with interruptions is shortened gradually as time elapses from when the affirmative determination is made in S105.

After finishing S3108 as described above, the flow proceeds to S111. When it is determined in S111 that the turning operation is being continued (corresponding to an affirmative determination), the flow reverts back to S107. When it is determined in S111 that the turning operation is finished (corresponding to a negative determination), the flow reverts back to S101. As described above, in the case of a one-unit anomaly during which S105, S107, S3108, and S111 are performed, an assist torque Ta is reduced continuously so as to be smaller than that output before the occurrence of the one-unit anomaly and during the normal control, while a turning operation on a steering wheel 40 proceeds. Additionally, in the event of the one-unit anomaly, the warning sound Sw is emitted with interruptions with the on-and-off period Pw, which is shortened as the time elapses, while the turning operation on the steering wheel 40 proceeds.

In the third embodiment described above, assist ECUs 303 and 313 that perform S105, S107, and S111, which represent a "torque control step," correspond to a "torque control part". Also in the third embodiment, the HCU 54 that performs S3108, which represents a "warning control step," corresponds to a "warning control part".

As described above, in the third embodiment, in the event of a one-unit anomaly, the assist torque Ta is reduced so as to be smaller than that output before the occurrence of the one-unit anomaly, while a turning operation on the steering wheel 40 proceeds. In this manner, continued increase in operation reaction force from the steering wheel 40 during a turning operation makes a user aware of a one-unit anomaly with greater ease. That is, it may be possible to enhance the recognizability of a one-unit anomaly by a user.

Furthermore, in the third embodiment, in the event of a one-unit anomaly, the warning sound Sw is emitted with interruptions while a turning operation on the steering wheel 40 proceeds. In this manner, the warning sound Sw is emitted with interruptions during the turning operation when the operation reaction force from the steering wheel 40 continues to increase, so that inconvenience felt by a user is mitigated while the recognizability of the one-unit anomaly by the user can be enhanced. Note that the on-and-off period Pw with which the warning sound Sw is emitted with interruptions is shortened as the time elapses and thereby a user is made aware of the seriousness of a one-unit anomaly intuitively with greater ease.

Other Embodiments

While some embodiments of the present disclosure have been described, the present disclosure should not be construed as being limited to these embodiments and is applicable to various embodiments and combinations thereof within a scope not departing from the spirit of the present disclosure.

Specifically, in a steering assist control flow according to first modifications of the first and second embodiments, an assist torque Ta may be controlled in S109 so as to be a torque identical with that output before S109 is performed. In this manner, in the first modifications, in the event of a one-unit anomaly, the amount of reduction in assist torque Ta is increased gradually in comparison with the normal control performed before the occurrence of the anomaly, every time a turning operation on the steering wheel 40 proceeds by the set angle δθs.

In a steering assist control flow according to second modifications of the first and second embodiments, the aural presentation of a warning sound Sw by a sound module 5s may be controlled in S110 so as to continue until the determination in S111 is finished. In this manner, in the second modifications, in the event of a one-unit anomaly, the warning sound Sw is emitted continuously while a turning operation on a steering wheel 40 proceeds.

In a steering assist control flow according to a third modification of the third embodiment, an on-and-off period Pw with which a sound module 5s emits a warning sound Sw with interruptions in S3108 may be set to a constant period. Alternatively, in a steering assist control flow according to a fourth modification of the third embodiment, an on-and-off period Pw with which a sound module 5s emits a warning sound Sw with interruptions in S3108 may be increased as time elapses.

In a steering assist control flow according to a fifth modification of the third embodiment, the aural presentation of a warning sound Sw by a sound module 5s may be controlled in S3108 so as to continue until the determination in S111 is finished. In this manner, in the fifth modification, in the event of a one-unit anomaly, the warning sound Sw is emitted continuously while a turning operation on a steering wheel 40 proceeds.

In a steering assist control flow according to sixth modifications of the first to third embodiments, the visual presentation of at least one of warning display images 561 and 571 by display components 50 and 52 may be excluded in S108, S110, and S3108. Alternatively or additionally, in a steering assist control flow according to seventh modifications of the first to third embodiments, the visual presentation of a warning display by a display part provided in addition to the display components 50 and 52 in a cabin 2c of a vehicle 2 may be performed in S108, S110, and S3108.

In a steering assist control flow according to eighth modifications of the first and second embodiments, the visual presentation of warning display images 561 and 571 by display components 50 and 52 may be excluded in at least one of S108 and S110. Similarly, in a steering assist control flow according to a ninth modification of the third embodiment, the visual presentation of warning display images 561 and 571 by display components 50 and 52 may be excluded in S3108.

In tenth modifications of the first and third embodiments, a sound module 5s may be disposed in a place outside an area surrounding a steering wheel 40 in a cabin 2c of a vehicle 2. Alternatively, in an eleventh modification of the third embodiment, the sound module 2005s according to the second embodiment may be used in place of the sound module 5s.

Figure 9:
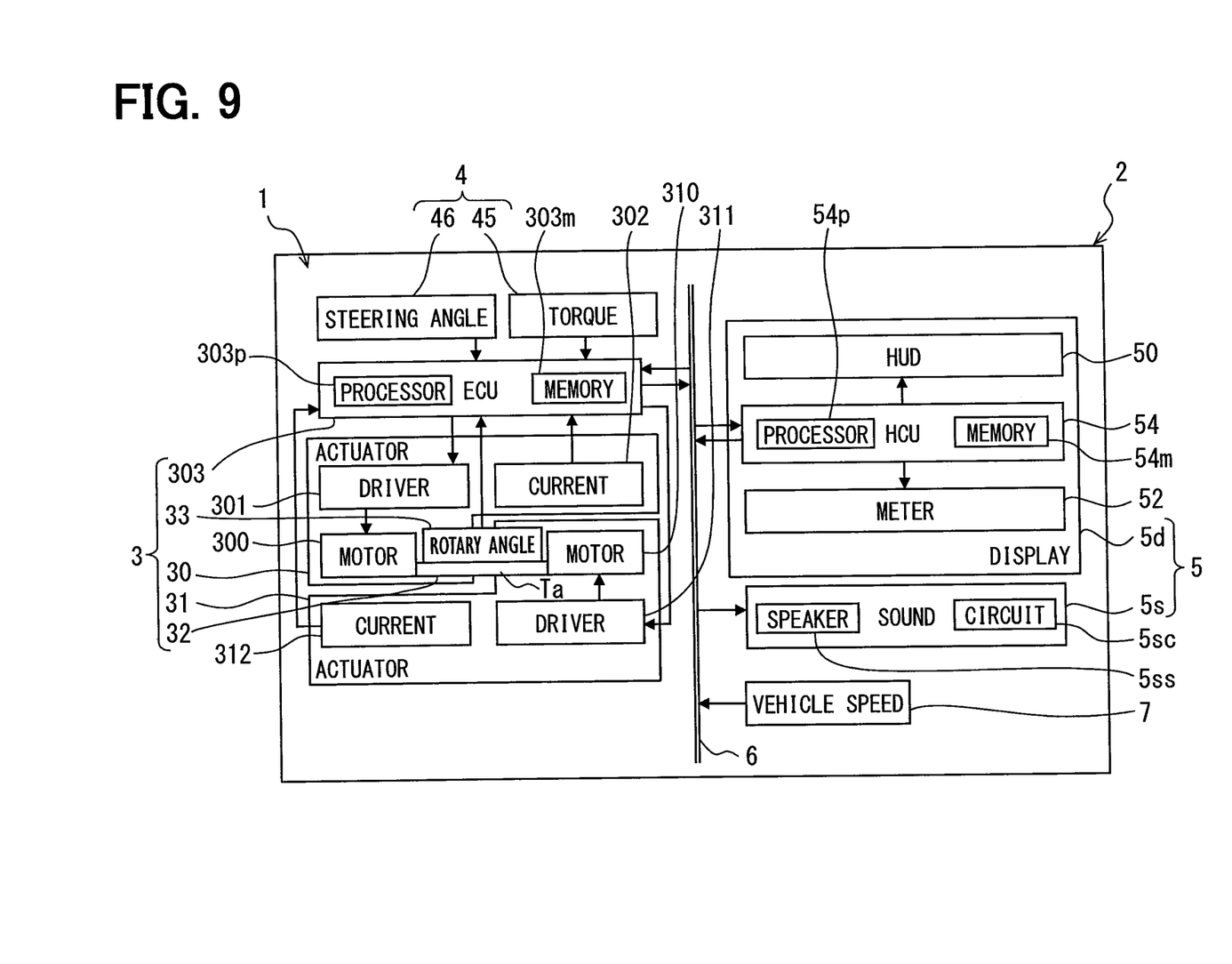
FIG. 9 is a block diagram of a modification of FIG. 1.

In twelfth modifications of the first to third embodiments, an output shaft 32 may be provided individually for each of the electric motors 300 and 310. The output shafts 32 may be coupled to a steering shaft 41 via speed reduction mechanisms 34 individually provided. Alternatively or additionally, in thirteenth modifications of the first to third embodiments, as illustrated in FIG. 9 (which is the thirteenth modification of the first embodiment), only an assist ECU 303 may be provided as a component for common use by actuator units 30 and 31 in an EPS apparatus 3. In the thirteenth modifications, current passage through electric motors 300 and 310 may be controlled by the common assist ECU 303, so that the control of an assist torque Ta in S102, S103, S107, and S109 is performed by the assist ECU 303.

Figure 10:
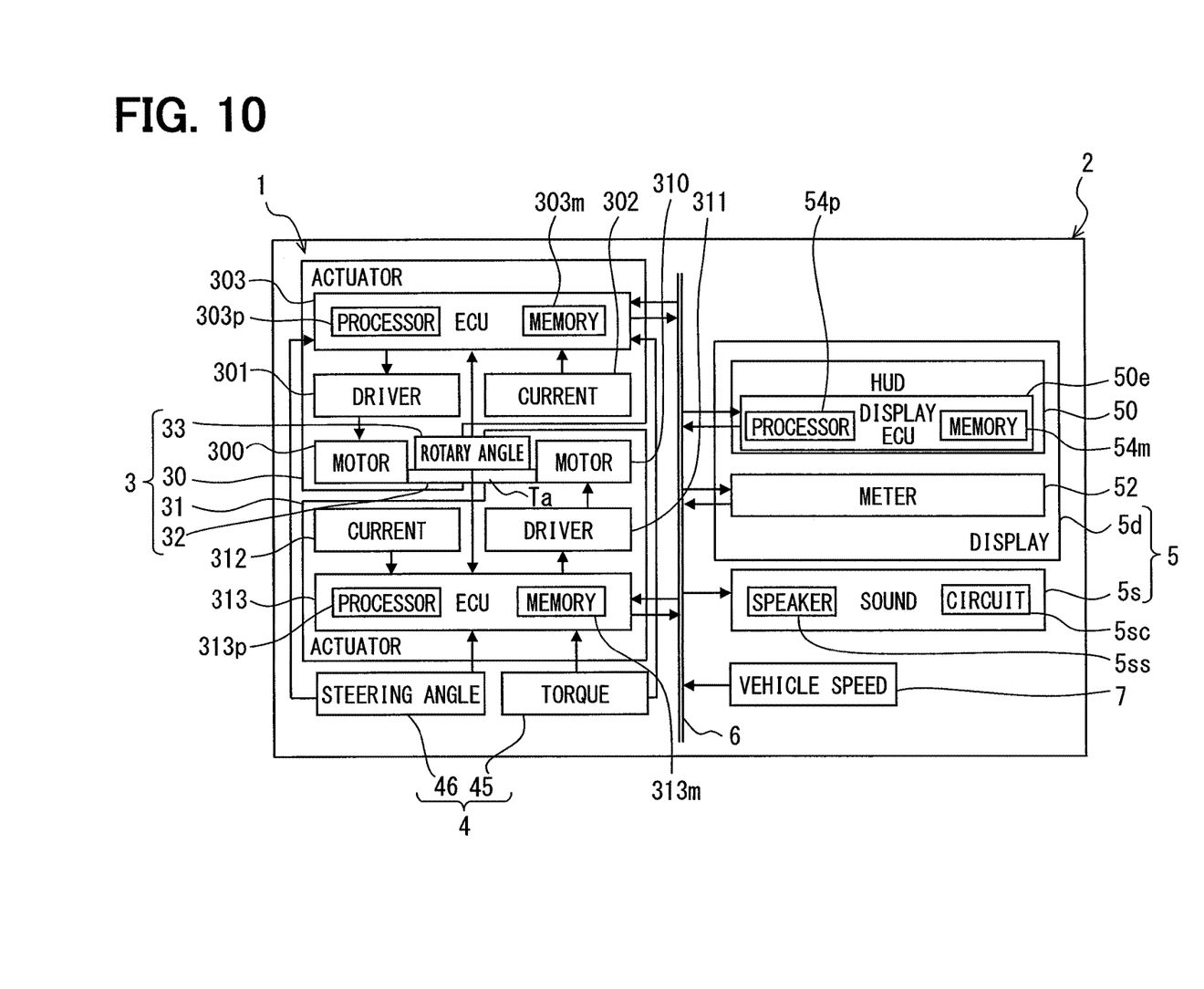
FIG. 10 is a block diagram of a modification of FIG. 1.

In fourteenth modifications of the first to third embodiments, as illustrated in FIG. 10 (which is the fourteenth modification of the first embodiment), the HCU 54 may be excluded. In such a fourteenth modification, a processor included in, for example, one of display ECUs disposed in display components 50 and 52 may execute a control program stored in a memory in the one of the display ECUs to achieve a part of the steering assist control flow. FIG. 10 represents a fourteenth modification in which an ECU 50e that is included in a HUD 50 and that includes a processor 54p and a memory 54m configures a "warning control part." The ECU 50e may also be referred to as a display ECU.

In fifteenth modifications of the first to third embodiments, at least one actuator unit may be provided in an EPS apparatus 3 in addition to the two actuator units 30 and 31.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of the steering assist control system and a steering assist control method according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A steering assist control system that causes a plurality of actuator units to control an assist torque that provides assistance in steering in accordance with a turning operation on a steering wheel in a vehicle having an information presentation apparatus, the steering assist control system comprising:
a monitoring part that monitors the actuator units;
a torque control part that reduces, in a case of a one-unit anomaly in which the monitoring part determines that one of the actuator units is anomalous and a remaining one of the actuator units is normal, the assist torque that results from combining output torques from all the actuator units so that the assist torque is smaller than an assist torque output before occurrence of the one-unit anomaly, in response to the turning operation being performed on the steering wheel; and
a warning control part controls the information presentation apparatus, so that a warning sound is presented aurally inside the vehicle in response to the torque control part reducing the assist torque,
wherein:
in the case of the one-unit anomaly, the torque control part reduces the assist torque so that the assist torque is smaller than an assist torque output before the occurrence of the one-unit anomaly, every time the turning operation proceeds by a set angle.

2. The steering assist control system according to claim 1, wherein:
in the case of the one-unit anomaly, the torque control part reduces the assist torque every time the turning operation proceeds by the set angle, and then, restores the assist torque to a torque that is output before reduction.

3. The steering assist control system according to claim 2, wherein:
in the case of the one-unit anomaly, the warning control part emits the warning sound intermittently every time the turning operation proceeds by the set angle.

4. The steering assist control system according to claim 1, wherein:
the warning control part controls the information presentation apparatus that emits the warning sound from an area surrounding the steering wheel in the vehicle.

5. The steering assist control system according to claim 1, wherein:
the warning control part controls the information presentation apparatus that imparts directivity to the warning sound toward a driver seat in the vehicle.

6. The steering assist control system according to claim 1, wherein:
the warning control part controls the information presentation apparatus so that a warning display image is presented visually inside the vehicle in response to the torque control part reducing the assist torque.

7. A steering assist control method that causes a plurality of actuator units to control an assist torque that provides assistance in steering in accordance with a turning operation on a steering wheel in a vehicle having an information presentation apparatus, the steering assist control method comprising:
a monitoring step that monitors the actuator units;
a torque control step that reduces, in a case of a one-unit anomaly in which the monitoring step determines that one of the actuator units is anomalous and a remaining one of the actuator units is normal, the assist torque that results from combining output torques from all the actuator units so that the assist torque is smaller than an assist torque output before occurrence of the one-unit anomaly, in response to hen the turning operation being performed; and
a warning control step that controls the information presentation apparatus so that a warning sound is presented aurally inside the vehicle in response to the torque control step reducing the assist torque,
wherein:
in the case of the one-unit anomaly, the torque control part reduces the assist torque so that the assist torque is smaller than an assist torque output before the occurrence of the one-unit anomaly, every time the turning operation proceeds by a set angle.

* * * * *

UNITED STATES PATENT AND TRADEMARK OFFICE
CERTIFICATE OF CORRECTION

PATENT NO. : 10,377,412 B2
APPLICATION NO. : 15/562599
DATED : August 13, 2019
INVENTOR(S) : Mitsuo Tamagaki Page 1 of 1

It is certified that error appears in the above-identified patent and that said Letters Patent is hereby corrected as shown below:

In the Claims

Column 14, Line 59, Claim 7, after "response to" delete "hen".

Signed and Sealed this
Tenth Day of December, 2019

Andrei Iancu
*Director of the United States Patent and Trademark Office*